United States Patent [19]

Abe et al.

[11] Patent Number: 4,876,180

[45] Date of Patent: Oct. 24, 1989

[54] METHOD OF AND APPARATUS FOR PROCESSING SILVER HALIDE-CONTAINING PHOTOSENSITIVE MATERIAL FOR COLOR PHOTOGRAPHY

[75] Inventors: Akira Abe; Junya Nakajima; Haruo Takase; Kazushige Uenaka; Ruyzi Otomo, all of Kanagawa, Japan

[73] Assignee: Fuji Photo Film Co., Ltd., Kanagawa, Japan

[21] Appl. No.: 217,995

[22] Filed: Jul. 12, 1988

Related U.S. Application Data

[62] Division of Ser. No. 12,461, Feb. 9, 1987.

[30] Foreign Application Priority Data

Feb. 7, 1986 [JP] Japan .................................. 61-25173

[51] Int. Cl.[4] .......................... C03C 7/00; C03C 5/38; C03C 5/24; C03C 5/44

[52] U.S. Cl. .................................... 430/393; 354/331; 430/430; 430/460; 430/462

[58] Field of Search ............... 430/393, 430, 460, 462; 354/331

[56] References Cited

U.S. PATENT DOCUMENTS 4,756,918 7/1988 Ueda et al. .......................... 430/393

*Primary Examiner*—Mukund J. Shah

*Attorney, Agent, or Firm*—Sughrue, Mion, Zinn, Macpeak & Seas

[57] ABSTRACT

A method of processing a silver halide-containing photosenstitive material for color photography includes the silver-removing step in which silver which is formed by reduction in the color developing step is oxidized by a bleaching agent and further changed into a soluble silver complex by the action of a fixing agent. In this process, bleaching is carried out in both a bleaching bath and a bleach-fixing bath, and fixing is effected in the bleach-fixing bath. In the bleach-fixing bath, a stream of bleach-fixing solution is brought into contact with the emulsion coating surface of the color photosensitive material at a higher flow velocity than that of a stream of bleach-fixing solution which is circulated in the bath. The time for processing carried out in the bleaching bath is set so as to be shorter than the time for processing in a bleaching bath in a conventional method wherein removal of silver is effected by the combination of a bleaching bath and a fixing bath which involves no bleaching process, and also the total time for processing carried out in the bleaching and bleach-fixing baths is set so as to be shorter than the total time for processing in the bleaching and fixing baths in said conventional method. As bleaching and fixing agents, a ferric aminopolycarboxylic acid complex and a thiosulfate are particularly effectively employed, respectively.

6 Claims, 4 Drawing Sheets

METHOD OF AND APPARATUS FOR PROCESSING SILVER HALIDE-CONTAINING PHOTOSENSITIVE MATERIAL FOR COLOR PHOTOGRAPHY

This is a division of application Ser. No. 07/012,461 filed Feb. 9, 1987, now allowed.

BACKGROUND OF THE INVENTION

1. Field of the Invention

The present invention relates to a method of and apparatus for processing a silver halide-containing photosensitive material for color photography (hereinafter referred to as a "color photosensitive material") which has already been exposed. More particularly, the present invention pertains to a speedy processing method in which silver-removing performance is improved by a large margin. The present invention is also concerned with an apparatus which may effectively be employed to carry out the above-described processing method.

2. Description of the Related Art

Basic steps in processing of general color photosensitive materials are color development and removal of silver. In the color developing step, the exposed Silver halide is reduced to silver by a color developing agent, and the oxidized color developing agent reacts with couplers to give a dye image. The silver thus formed is oxidized by a bleaching agent in the subsequent silver-removing step and further changed into a soluble silver complex by the action of a fixing agent so as to be removed through dissolution.

An actual development processing includes, in addition to the above-described basic steps, a variety of auxiliary steps which are carried out for the purpose of maintaining the required photographic and physical qualities of images or improving the storage stability of images, such as the hardening bath, the stop bath, the image stabilizing bath and the washing bath.

There has recently been a strong demand in the art to speed up the processing, that is, to reduce the time required for the processing, particularly, the time required to complete the silver-removing step, which accounts for nearly a half of the total processing time.

As means for promoting removal of silver, there has been known a bleach-fixing bath (disclosed in the specification of German Patent No. 866,605) which is a monobath consisting of a ferric aminopolycarboxylic acid complex and a thiosulfate. However, in this bleach-fixing bath, a ferric aminopolycarboxylic acid complex, which originally has relatively weak oxidizing power (bleaching power), is put in contact with a thiosulfate, which has reducing power. Accordingly, the bleaching power of this bath may be weakened considerably, so that it is extremely difficult for the bath to satisfactorily remove silver from a color photosensitive material having high sensitivity and a high silver content, and the bleach-fixing bath cannot be put into practical use, disadvantageously.

On the other hand, as means for increasing the bleaching power, there have already been proposed a variety of methods in which various kinds of bleach accelerator are added to the bleaching bath or the bleach-fixing bath or a prebath which is provided at the upstream side of these baths. Examples of such bleach accelerators include a variety of mercapto compounds such as those disclosed in the specifications of U.S. Pat. No. 3,893,895, British Patent No. 138842 and Japanese Patent Laid-Open No. 141623/1978, compounds having a disulfide linkage such as those disclosed in the specification of Japanese Patent Laid-Open No. 95630/1978, thiazolidine derivatives such as those disclosed in the specification of Japanese Patent Publication No. 9854/1978, isothiourea derivatives such as those disclosed in the specification of Japanese Patent Laid-Open No. 94927/1978, thiourea derivatives such as those disclosed in the specifications of Japanese Patent Publication Nos. 8506/1970 and 26586/1974, thioamide compounds such as those disclosed in the specification of Japanese Patent Laid-Open No. 42349/1974, and dithiocarbamates such as those disclosed in the specification of Japanese Patent Laid-Open No. 26506/1980.

However, addition of these bleach accelerators into the bleaching bath, the bleach-fixing bath or a prebath provided at the upstream side of these baths provides no satisfactory increase in the speed of processing, and further improvement is therefore demanded.

In order to overcome these disadvantages, the present inventors have already proposed methods in which a bath having bleaching power is provided at the upstream side of a bath having a bleach-fixing power (see Japanese Patent Nos. 198197/1984 and 198198/1984),laid open on Apr. 17, 1986 as Japanese Patent Laid-Open Nos. 75352/1986 and 75353/1986, respectively. The time required for processing in the bleaching bath in the proposed method wherein removal of silver is carried out in two baths, that is, the bleaching bath and the bleach-fixing bath, can be set so as to be shorter than that in the conventional method wherein removal of silver is effected by combination of the bleaching bath and the fixing bath. However, since the time required for processing in the bleach-fixing bath depends upon the time required for completion of the fixing processing carried out to change the oxidized silver into a soluble silver halide, the processing time for the bleach-fixing bath must be set so as to be considerably longer than the time required for processing in the fixing bath in the method wherein removal of silver is effected by combination of the bleaching bath and the fixing bath.

SUMMARY OF THE INVENTION

In view of the above-described circumstances, it is one object of the present invention to provide a method of processing a silver halide-containing photosensitive material for color photography which enables acceleration of removal of silver even in the case of a color photosensitive material containing a particularly large amount of silver, thus allowing a reduction in the time required for processing.

It is another object of the present invention to provide an apparatus which may effectively be employed to carry out the above-described processing method. (It should be noted that a bath which has bleaching power will hereinafter be referred to simply as a "bleaching bath and a bath which has bleach-fixing power as a "bleach-fixing bath").

To these ends, according to one aspect of the present invention, there is provided a method of processing a silver halide-containing photosensitive material for color photography, which has the color developing step in which the silver halide in the photosensitive material is reduced to silver, and the silver-removing step in which the silver formed in the color developing step is oxidized by a bleaching agent and further changed into a soluble silver complex by the action of a fixing agent so as to be removed through dissolution, wherein the improvement comprises: providing a bleaching bath and a bleach-fixing bath which is disposed at the downstream side of the bleaching bath; carrying out bleaching in both the bleaching and bleach-fixing baths; carrying out fixing in the bleach-fixing bath; setting the time for processing carried out in the bleaching bath so as to be shorter than the time for processing in a bleaching bath in a conventional method wherein removal of silver is effected by the combination of a bleaching bath and a fixing bath which involves no bleaching process; setting the total time for processing carried out in the bleaching and bleach-fixing baths so as to be shorter than the total time for processing in the bleaching and fixing baths in the conventional method; and bringing a stream of bleach-fixing solution into contact with the emulsion coating surface of the photosensitive material in the bleach-fixing bath at a flow velocity which is greater than the flow velocity of stream of bleach-fixing solution which is circulated in the bleach-fixing bath.

According to another aspect of the present invention, there is provided an apparatus for processing a silver halide-containing photosensitive material for color photography, comprising: a bleaching bath tank; a bleach-fixing bath tank provided at the downstream side of the bleaching bath tank; and bath solution supply means for supplying a bath solution to the emulsion coating surface of the photosensitive material at a relatively high flow velocity.

By virtue of the above-described arrangement, the bleaching bath tank in an automatic developing machine can be made shorter than the developing bath tank and the conventional fixing bath tank, and the height of the bleach-fixing bath tank can also be made substantially equal to that of the conventional fixing bath tank, thus eliminating the problem that the bleach-fixing bath tank alone projects to an extreme extent.

In the bleaching bath and bleach-fixing bath which are employed in the present invention, it is possible to use any known bleaching agent selected from among potassium ferricyanide, dichromates, persulfates, inorganic ferric salts and organic ferric salts. However, it is particularly preferable to employ a ferric aminopolycarboxylic acid complex, which presents fewer problems in regard to water pollution and corrosion of metals and which is favorably stable. Two or more different kinds of bleaching agent may be combined. The bleaching bath and the bleach-fixing bath may use different bleaching agents from each other. For example, an iron chloride and a ferric aminopolycarboxylic acid complex may be employed for the bleaching bath and the bleach-fixing bath, respectively. Ferric aminopolycarboxylic acid complex is a complex of ferric ion and an aminopolycarboxylic acid or a salt thereof.

Typical examples of aminopolycarboxylic acids and salts thereof are as follows:

A-1 ethylenediaminetetraacetic acid
A-2 disodium ethylenediaminetetraacetate
A-3 diammonium ethylenediaminetetraacetate
A-4 ethylenediaminetetraacetate acid (trimethylammonium) A-5 tetrapotassium ethylenediaminetetraacetate
A-6 tetrasodium ethylenediaminetetraacetate
A-7 trisodium ethylenediaminetetraacetate
A-8 diethylenetriaminepentaacetic acid
A-9 pentasodium diethylenetriaminepentaacetic acid
A-10 ethylenediamine-N-(β-oxyethyl)-N, N', N'-triacetic acid
A-11 trisodium ethylenediamine-N-(β-oxyethyl)-N, N', N'-triacetate
A-12 triammonium ethylenediamine-N-(β-oxyethyl)-N, N', N'-triacetate
A-13 propylenediaminetetraacetic acid
A-14 disodium propylenediaminetetraacetate
A-15 nitrilotriacetic acid
A-16 trisodium nitrilotriacetate
A-17 cyclohexanediaminetetraacetic acid
A-18 disodium cyclohexanediaminetetraacetate
A-19 iminodiacetic acid
A-20 dihydroxyethylglycine
A-21 ethyl ether diaminetetraacetic acid
A-22 glycol ether diaminetetraacetic acid
A-23 ethylenediaminetetrapropionic acid It is a matter of course that the present invention is not necessarily limited to the above-exemplified compounds.

Among these compounds, A-1 to A-3, A-8 and A-17 are particularly preferable.

In the present invention, at least one of the baths, that is, the bleaching bath, the bleach-fixing bath and a pre-bath which is provided at the upstream side of them can employ a bleach accelerator selected from among those described above.

In the bleach-fixing bath in the present invention, a thiosulfate is employed as a fixing agent. Thiosulfate can be employed in an amount ranging from 0.8 to 2 mol/l, preferably from 1.2 to 1.5 mol/l, and particularly preferably from 1.2 to 1.4 mol/l. When the amount of thiosulfate falls within the described range, the jet stirrer according to the present invention operates most effectively.

Examples of thiosulfates which may be employed in the present invention include sodium thiosulfate, ammonium thiosulfate, ammonium sodium thiosulfate and potassium thiosulfate. Among these thiosulfates, ammonium thiosulfate is most preferable.

DESCRIPTION OF THE PREFERRED EMBODIMENTS

Figure 1:
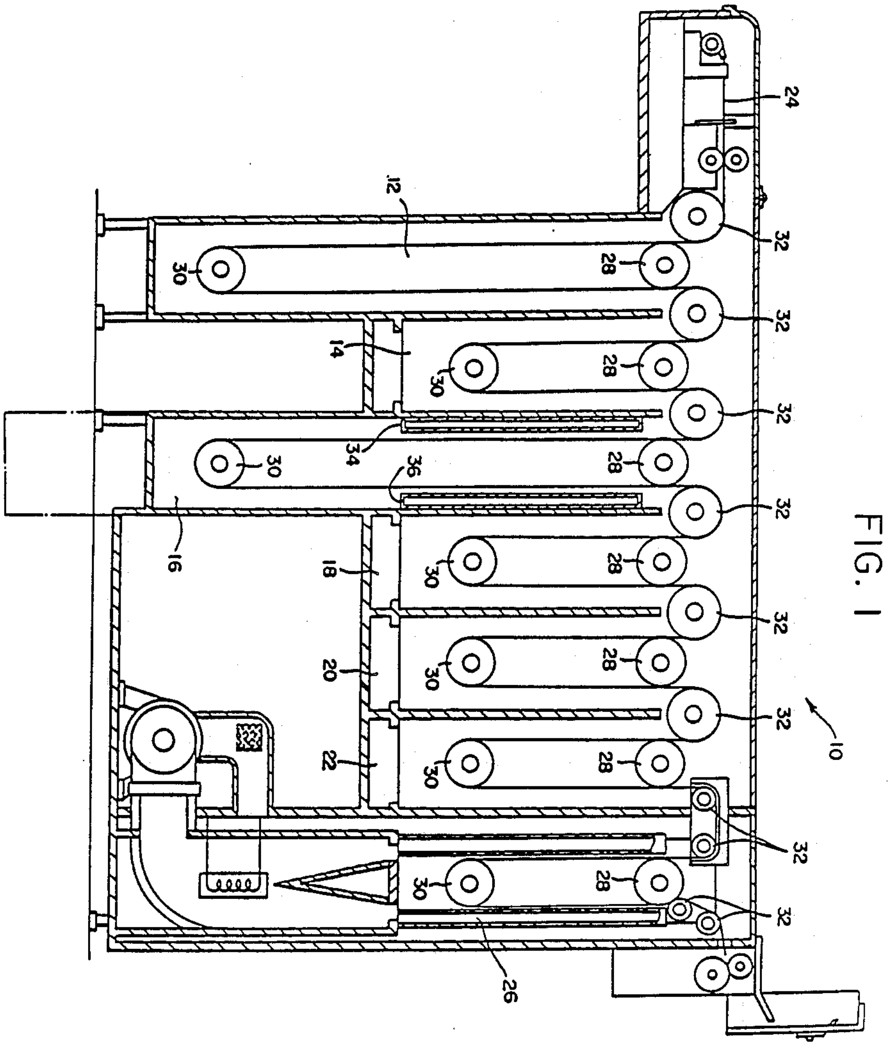
FIG. 1 is a sectional view schematically illustrating the arrangement of an automatic developing machine for carrying out the photosensitive material processing method according to the present invention.
Figure 2:
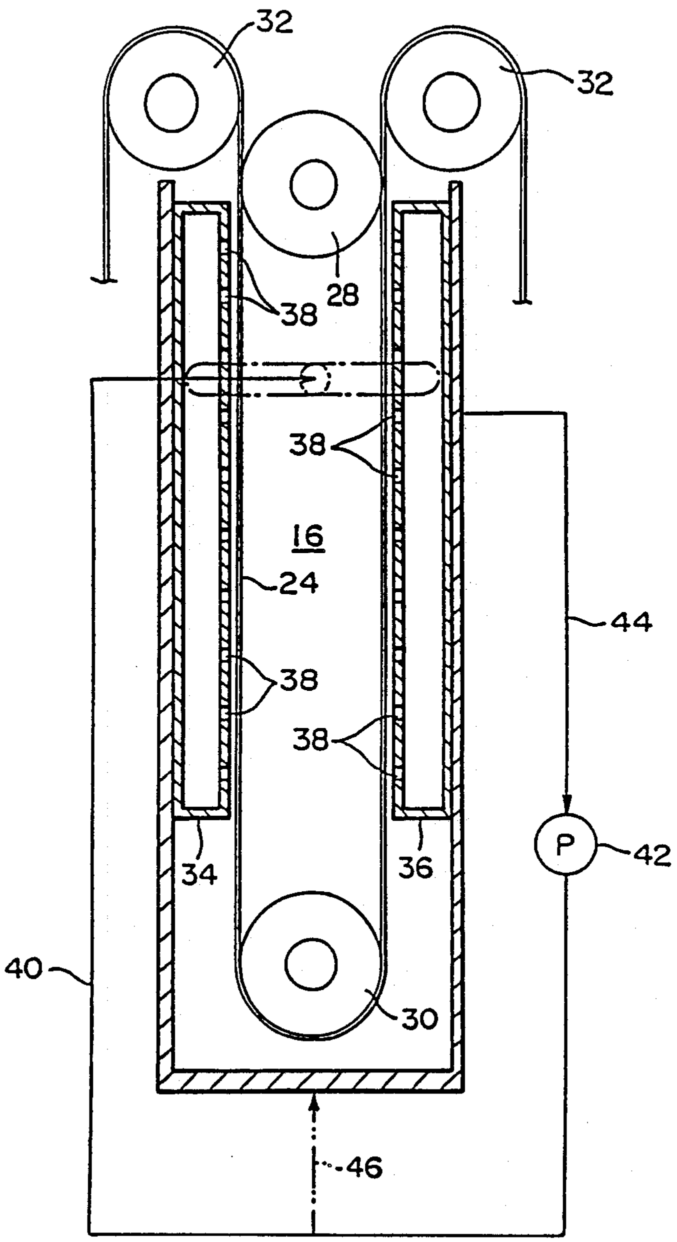
FIG. 2 is an enlarged sectional view illustrating a bleach-fixing bath tank employed in the automatic developing machine illustrated in FIG. 1, which shows one embodiment of the photosensitive material processing apparatus according to the present invention.
Figure 3:
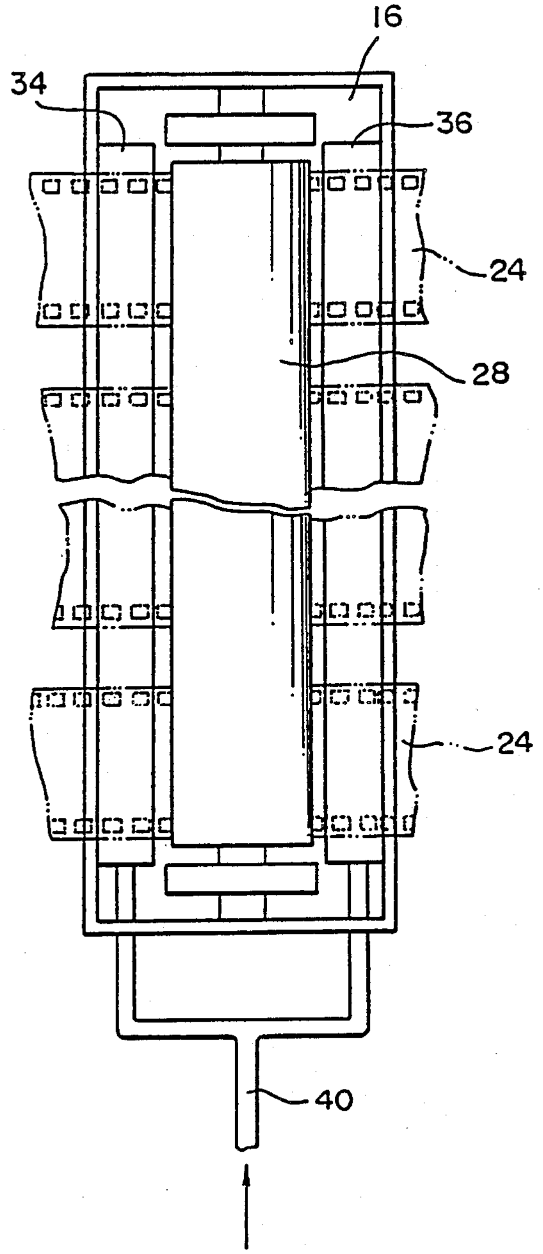
FIG. 3 is a plan view of the bleach-fixing bath tank shown in FIG. 2.

FIGS. 1 to 3 show in combination an automatic developing machine 10 for negative film to which one embodiment of the present invention is applied.

In the automatic developing machine 10, negative films 24 are advanced through a color developing bath tank 12, a bleaching bath tank 14, a bleach-fixing bath tank 16, washing tanks 18, 20 and a stabilizing tank 22 in that order so as to be subjected to development, bleaching, washing and stabilization treatment, and then dried in a drying section 26 before being taken out of the machine 10.

These processing tanks are filled with processing solutions, respectively, and each processing tank has feed rollers 28 and 30 which are disposed in the upper and lower portions, respectively, of the tank. The negative films 24 are transported through each processing tank while being guided by these rollers 28 and 30, and advanced to a subsequent processng tank through a feed roller 32 which is disposed at a position between each pair of adjacent processing tanks.

The bleach-fixing bath tank 16 in this embodiment has chambers 34 and 36 for generating high-speed streams of solution which are disposed so as to face the emulsion coating surfaces of the negative films 24 which are moved while being guided by the rollers 28 and 30. As shown in FIG. 2, each of the chambers 34 and 36 is formed in a box-like shape from a thin-wall plate material and has a plurality of slits 38 which face the emulsion coating surfaces of the passing negative films 24 so as to supply jets of solution to the emulsion coating surfaces. The slits 38 are defined by elongated openings whose longitudinal axes extend perpendicularly to the direction of movement of the negative films 24, that is, parallel to the lateral direction of the films 24. However, each slit 38 may be defined by a row of a plurality of openings having a relatively small diameter, or nozzles or the like may be provided in order to determine the direction in which streams of solution flows.

The chambers 34 and 36 are communicated with a pump 42 by a fluid supply pipe 40 so that a processing fluid is supplied to the chambers 34 and 36 from the pump 42. The pump 42 is communicated with the upper end portion of the bleach-fixing bath tank 16 by a fluid supply pipe 44 so as to suck in the processing fluid within the bleach-fixing bath tank 16. A part of the fluid supply pipe 40 is able to communicate with the lower end portion of the bleach-fixing bath tank 16 through a fluid supply pipe 46, so that, when the bleach-fixing bath tank 16 has a relatively large size, the processing fluid from the pump 42 can be supplied to the lower portion of the processing tank 16 according to need. The fluid supply pipe 46 mainly serves to circulate the processing fluid within the processing tank 16 at relatively low speed.

Further, each processing tank is supplied with a fresh processing fluid separately from the circulated processing fluid, and overflowing processing fluid is discarded.

In this embodiment arranged as described above, when the automatic developing machine 10 is run and the feed rollers 28, 30 and 32 are rotated, the negative films 24 are fed through the processing tanks successively. If desired, the negative films 24 may be guided to each roller using a leader or the like which leads the forwarding end of each film 24.

The pump 42 supplies the processing fluid to the bleach-fixing bath tank 16 through the fluid supply pipes 44 and 46. The processing fluid pumped into the tank 16 through the fluid supply pipe 46 causes the processing fluid within the tank 16 to circulate at relatively low speed and to return to the pump 42 from the upper side of the tank 16.

Further, the processing fluid pumped through the fluid supply pipe 40 is supplied at relatively high speed toward the emulsion coating surfaces of the negative films 24 from the slits 38 which are provided in the chambers 34 and 36. Accordingly, the processing fluid at the emulsion coating surfaces is actively replaced with fresh processing fluid, which means that the removal of silver is accelerated and the time required for processing can be reduced.

For example, when the processing fluid is circulated at a flow rate of 6l per minute, if the processing fluid is supplied at relatively high speed by means of rollers, in addition to the circulation of the processing fluid, in such a manner that the rollers are rotated with their raised or napped surfaces brought into contact or close proximity with the emulsion surfaces of the negative films 24, then the processing time in the bleaching bath tank 14 is reduced to two minitues, while the processing time in the bleach-fixing bath tank 16 is reduced to four minutes, and it is therefore possible to reduce the volumetric capacity of the bleaching bath tank 14 to 3.5l and that of the bleach-fixing bath tank 16 to 9l. In contrast, the conventional processing method in which no high-speed supply of fluid is carried out requires 4 minutes to complete the processing in the bleaching bath tank 14 and therefore necessitates the bleaching bath tank 14 to be increased in size or the bleach-fixing bath tank 16 to be defined by two tanks which are disposed in series and each of which is increased in size as shown by the imaginary line in FIG. 1, and this leads to an increase in the overall size of the automatic developing machine 10, disadvantageously.

It should be noted that the bleach-fixing solution for the bleach-fixing bath tank 16 may be formed by mixing a bleaching solution and a fixing solution which are shown in Experimental Example 1 in the ratio 2:3.

Although in the above-described embodiment the processing fluid from the pump 42 is supplied to the lower part of the processing tank through the fluid supply pipe 46 so as to be circulated at relatively low speed, the processing fluid within the processing tank may be circulated by means of high-speed streams of fluid which is supplied through the fluid supply pipe 40, the chambers 34, 36 and the slits 38 rather than by means of the processing fluid which is supplied from the pipe 46. Further, openings which are larger than the slits 38 may be provided in portions of the chambers 34 and 36 where the slits 38 are not provided (e.g., in the bottoms of the chambers 34 and 36) for the purpose of circulating the processing fluid at relatively low speed.

In addition, the color developing bath tank 12 may also be provided with chambers similar to those provided in the bleach-fixing bath tank 16 to supply jets of developing solution to the films 24 passing through the tank 12 as in the case of conventional practice.

Figure 4:
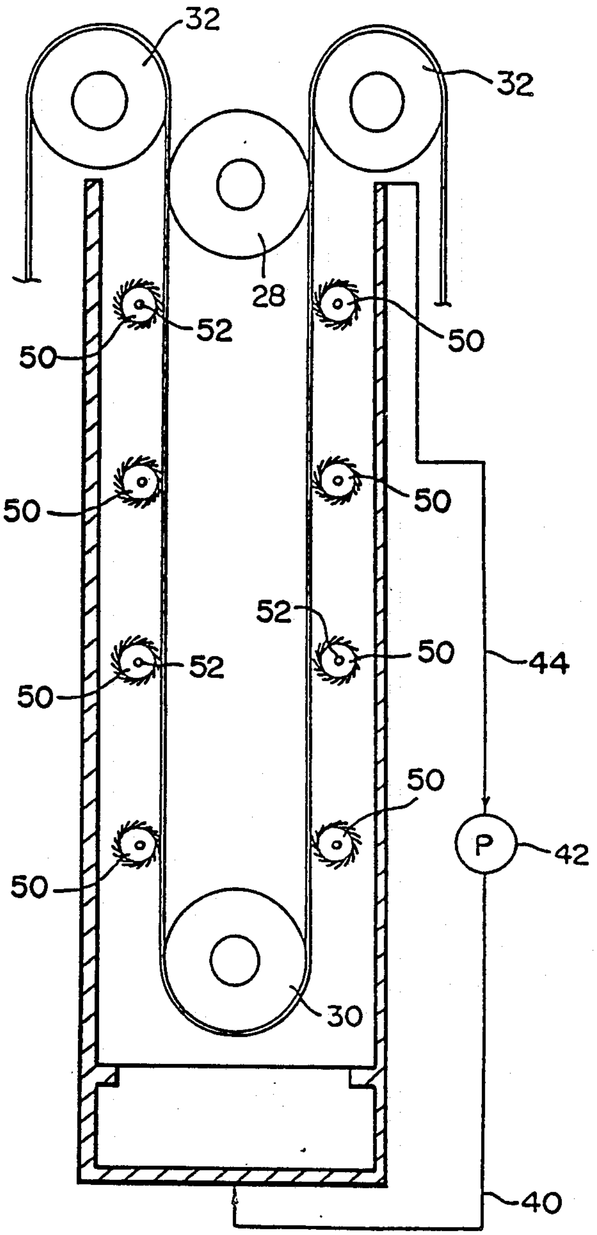
FIG. 4 is an enlarged sectional view of a bleach-fixing bath tank in accordance with another embodiment of the processing apparatus according to the present invention.

FIG. 4 shows another embodiment of the present invention, in which rollers 50 are employed in place of the chambers 34 and 36 provided in the above-described embodiment. The rollers 50 are rotated through respective shafts 52 by driving means such as a motor in such a manner that their raised surfaces are brought into contact or close proximity with the emulsion coating surfaces of the negative films 24, thereby supplying the processing fluid to the emulsion coating surfaces at relatively high speed, and thus rapidly removing silver from the films 24. In this case, the fluid supply pipe 40 is employed to supply processing fluid which is circulated at relatively low speed.

The rollers 50 may be provided with a multiplicity of irregularities in place of the raised surfaces, or brush rollers may be employed in place of the rollers 50.

EXPERIMENTAL EXAMPLE 1

Color negative films (Fujicolor HR-400) were exposed to light of 20CMS by employing a tungsten light source and adjusting the color temperature to 4800° K. with a filter, and then developed by an automatic developing machine under the following conditions.

The processing time for each of the fixing and bleach-fixing operations was changed from 2 minutes to 7 minutes at regular time intervals of 30 seconds by adjusting the speed of transportation of the films.

Stirring of the fixing and bleach-fixing baths was carried out by two methods, that is, the jet stirring according to the present invention and normal stirring by circulation which is different from that employed in the present invention.

TABLE 1

| | Processing Time | |
|---|---|---|
| | Processing A | Processing B |
| Color development | 3'15" | 3'15" |
| Bleaching | 3'15" | 1'00" |
| Bleach-fixing | — | shown in Table 2 |
| Fixing | shown in Table 2 | — |
| Washing | 1'40" | 1'40" |
| Stabilizing | 40" | 40" |

A variety of fixing solutions and bleach-fixing solutions were prepared by changing stepwise the thiosulfate concentration in the mixture.

The compositions of the processing fluids employed in the above-described processes are as follows:

| | |
|---|---|
| Color Developer | |
| Diethylenetriaminepentaacetic acid | 1.0 g |
| 1-hydroxyethylidene-1,1-diphosphonic acid | 2.0 g |
| Sodium sulfite | 4.0 g |
| Potassium carbonate | 30.0 g |
| Pottasium bromide | 1.4 g |
| Potassium iodide | 1.3 mg |
| Hydroxyaminesulfate | 2.4 g |
| 4-(N—ethyl-N—β-hydroxyethylamino)-2-methylaniline sulfate | 4.5 g |
| Water | balance |
| Total | 1 l |
| pH | 10.00 |
| Bleaching Solution | |
| Ammonium salt of ferric ethylenediaminetetraacetic acid | 120.0 g |
| Disodium ethylenediaminetetraacetate | 10.0 g |
| Aqueous ammonia | 17.0 ml |
| Ammonium nitrate | 10.0 g |
| Ammonium bromide | 160.0 g |
| Bleach accelerator | $6 \times 10^{-3}$ mol |

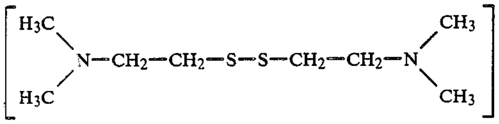

| | |
|---|---|
| Water | balance |
| Total | 1 l |
| pH | 6.0 |
| Bleach-Fixing Solution | |
| Ammonium salt of ferric ethylenediaminetetraacetic acid | 50.0 g |
| Disodium ethylenediaminetetraacetate | 5.0 g |
| Sodium sulfite | 12.0 g |
| Ammonium thiosulfate | shown in Table-2 |
| Aqueous ammonia | 10.0 ml |
| Water | balance |
| Total | 1 l |
| pH | 7.3 |
| Fixing Solution | |
| Ammonium thiosulfate | shown in Table-2 |
| Sodium sulfite | 6.0 g |
| Sodium bisulfite | 5.0 g |
| Disodium ethylenediaminetetraacetate | 0.5 g |
| Water | balance |
| Total | 1 l |
| pH | 6.6 |
| Stabilizer | |
| Formalin (37% W/V) | 2.0 ml |
| Polyoxyethylene-p-monononylphenylether (mean degree of polymerization: 10) | 0.3 g |
| Water | balance |
| Total | 1 |

For each of the samples processed as described above, the residual amount of silver in the maximum silver density region was measured by the fluorescent X-ray analysis.

Table-2 shows the fixing time or bleach-fixing time for each sample which is defined by a period of time required for the residual amount of silver to be 5 μg/cm$^2$ or less, and the total time required for removal of silver for each sample which is the sum of the fixing or bleach-fixing time and the bleaching time.

TABLE 2

| | No. | Processing | Stirring | Thiosulfate | Time Required for Removal of Silver (fixing or bleach-fixing time) Fixing or bleach-fixing time | Total time |
|---|---|---|---|---|---|---|
| Comparative Example | 1 | A | N* | 0.9 mol/l | 4'30" | 7'45" |
| Comparative Example | 2 | A | J** | 0.9 | 4'00" | 7'15" |
| Comparative Example | 3 | A | N | 1.2 | 4'00" | 7'15" |
| Comparative Example | 4 | A | J | 1.2 | 3'30" | 6'45" |
| Comparative Example | 5 | B | N | 0.9 | 5'30" | 6'30" |
| Present Invention | 6 | B | J | 0.9 | 3'30" | 4'30" |
| Comparative Example | 7 | B | N | 1.2 | 5'00" | 6'00" |
| Present Invention | 8 | B | J | 1.2 | 2'30" | 3'30" |
| Present Invention | 9 | B | J | 1.4 | 2'30" | 3'30" |
| Present Invention | 10 | B | J | 1.8 | 3'30" | 4'30" |

N* normal stirring by circulation different from that employed in the present invention
J** jet stirring according to the invention As will be clear from Table-2, employment of the jet stirring for the bleach-fixing bath provides greater effectiveness of promoting removal of silver than that in the case where the jet stirring is employed for the fixing bath.

It may be understood from Table-2 that the bleach promoting action is most effective when the thiosulfate concentration is 1.2 or 1.4 mol/l. Thus, the total time for removal of silver can be reduced by a large margin.

EXPERIMENTAL EXAMPLE 2

Processing was carried out in the same way as in Experimental Example 1 except for the following.

TABLE 3

| | Processing Time Processing A | Processing B |
|---|---|---|
| Color development | 3'15" | 3'15" |
| Bleaching | 3'15" | — |
| Bleach-fixing | — | shown in Table 2 |
| Fixing | shown in Table 2 | — |
| Washing | 1'40" | 1'40" |
| Stabilizing | 40" | 40" |

BLEACHING SOLUTION

The bleach accelerator was changed as follows.

Bleach accelerator 6 × $10^{-3}$ mol

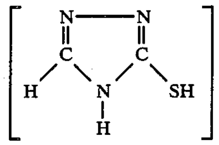

BLEACH-FIXING SOLUTION

A bleach accelerator was added.

Bleach accelerator 6 × $10^{-3}$ mol

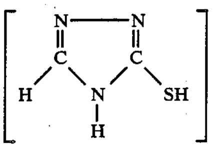

The results of processing carried out under the above-described conditions are shown in Table-4 in the same manner as in Experimental Example 1.

TABLE 4

| | No. | Processing | Stirring | Thiosulfate | Time Required for Removal of Silver (fixing or bleach-fixing time) Fixing or bleach-fixing time | Total time |
|---|---|---|---|---|---|---|
| Comparative Example | 1 | A | N | 0.9 mol/l | 5'00" | 8'15" |
| Comparative Example | 2 | A | J | 0.9 | 4'30" | 7'45" |
| Comparative Example | 3 | A | N | 1.2 | 4'30" | 7'45" |
| Comparative Example | 4 | A | J | 1.2 | 4'00" | 7'15" |

TABLE 4-continued

| | No. | Time Required for Removal of Silver (fixing or bleach-fixing time) Processing | Stirring | Thiosulfate | Fixing or bleach-fixing time | Total time |
|---|---|---|---|---|---|---|
| Comparative Example | 5 | C | N | 0.9 | 7'30" | 7'30" |
| Present Invention | 6 | C | J | 0.9 | 6'00" | 6'00" |
| Comparative Example | 7 | C | N | 1.2 | 7'00" | 7'00" |
| Present Invention | 8 | C | J | 1.2 | 5'00" | 5'00" |
| Present Invention | 9 | C | J | 1.4 | 5'00" | 5'00" |
| Present Invention | 10 | C | J | 1.8 | 6'00" | 6'00" |

As will be clear from Table-4, employment of the jet stirring for the bleach-fixing bath provides considerably great effectiveness of promoting removal of silver and the bleach promoting action is particularly effective when the thiosulfate concentration is 1.2 or 1.4 mol/l.

As has been described above, according to the present invention, a bleaching bath and a bleach-fixing bath which is disposed at the downstream side of the bleaching bath are provided, and bleaching is carried out in both the bleaching and bleach-fixing baths, while fixing is carried out in the bleach-fixing bath. The time for processing carried out in the bleaching bath is set so as to be shorter than the time for processing in a bleaching bath in a conventional method wherein removal of silver is effected by the combination of a bleaching bath and a fixing bath which involves no bleaching process, and also the total time for processing carried out in the bleaching and bleach-fixing baths is set so as to be shorter than the total time for processing in the bleaching and fixing baths in said conventional method. Further, in the bleach-fixing bath a stream of bleach-fixing solution is brought into contact with the emulsion coating surface of a color photosensitive material at a higher flow velocity than that of a stream of bleach-fixing solution which is circulated in the bath. Accordingly, it is advantageously possible to complete removal of silver within a shortened period of time even in the case of processing a film containing a relatively large amount of silver.

Although the present invention has been described through specific terms, it should be noted here that the described embodiments are not necessarily limitative and various changes and modifications may be imparted thereto without departing from the scope of the invention which is limited solely by the appended claims.

What is claimed is:

1. An apparatus for processing a silver halide-containing photosensitive material for color photography, comprising:

a bleaching bath tank;

a bleach-fixing bath tank provided downstream of said bleaching bath tank; and bath solution jetting means for jetting bleaching-fixing solution to bring a stream of bleaching-fixing solution in contact with the emulsion coating surface of said photosensitive material in said bleaching-fixing bath tank at a flow velocity which is greater than the flow velocity of bleaching-fixing solution which is circulated in said bleach-fixing bath tank whereby the rate of silver removal of said photosensitive material is increased.

2. A processing apparatus according to claim 1, wherein said bath solution jetting means includes means having a chamber provided in said bleach-fixing bath tank, said jetting means being provided in a side wall of said chamber which faces the emulsion coating surface of said photosensitive material.

3. A processing apparatus according to claim 1, further comprising a rotary roller installed within said bleach-fixing bath tank so as to face the emulsion coating surface of said photosensitive material, said roller being rotated at a peripheral speed higher than the flow velocity of a stream of bath solution circulated in said bleach-fixing bath tank so that a stream of bath solution is brought into contact with the emulsion coating surface of said photosensitive material at relatively high speed by virtue of the rotation of said roller.

4. A processing apparatus according to claim 2, wherein the direction of a jet of bath solution which is jetted out from said jetting means provided in said chamber toward the emulsion coating surface of said photosensitive material is set so as to be perpendicular to said emulsion coating surface.

5. A processing apparatus according to claim 2, wherein said jetting means has a plurality of nozzles provided in a side wall thereof which faces the emulsion coating surface of said photosensitive material.

6. A processing apparatus according to claim 2, wherein said chamber is arranged so that the bath solution in said bleach-fixing bath tank is introduced thereinto by means of suction.

* * * * *